US 7,512,879 B2

(12) United States Patent
Weil et al.

(10) Patent No.: US 7,512,879 B2
(45) Date of Patent: Mar. 31, 2009

(54) INTELLIGENT VIRTUAL PAGING PARADIGM

(75) Inventors: Steven Weil, Bellevue, WA (US); Wei Zhu, Shoreline, WA (US); William Hill, Carnation, WA (US)

(73) Assignee: Microsoft Corporation, Redmond, WA (US)

(\*) Notice: Subject to any disclaimer, the term of this patent is extended or adjusted under 35 U.S.C. 154(b) by 520 days.

(21) Appl. No.: 09/854,149

(22) Filed: May 11, 2001

(65) Prior Publication Data

US 2004/0205623 A1    Oct. 14, 2004

(51) Int. Cl.
*G06F 17/00* (2006.01)

(52) U.S. Cl. ................................ 715/251; 715/256
(58) Field of Classification Search ........... 715/525, 715/521, 526, 517, 247, 251, 273, 256
See application file for complete search history.

(56) References Cited

U.S. PATENT DOCUMENTS

| | | | | |
|---|---|---|---|---|
| 4,622,545 A | * | 11/1986 | Atkinson | 345/562 |
| 4,965,670 A | * | 10/1990 | Klinefelter | 348/586 |
| 5,634,064 A | * | 5/1997 | Warnock et al. | 715/513 |
| 5,781,785 A | * | 7/1998 | Rowe et al. | 715/513 |
| 5,784,487 A | * | 7/1998 | Cooperman | 382/175 |
| 5,909,217 A | * | 6/1999 | Bereiter | 345/854 |
| 6,128,633 A | * | 10/2000 | Michelman et al. | 715/525 |
| 6,175,845 B1 | * | 1/2001 | Smith et al. | 715/525 |
| 6,188,779 B1 | * | 2/2001 | Baum | 382/114 |
| 6,694,485 B1 | * | 2/2004 | Kelley et al. | 715/525 |
| 6,741,268 B1 | * | 5/2004 | Hayakawa | 345/777 |
| 2002/0103717 A1 | * | 8/2002 | Swart et al. | 705/26 |
| 2002/0116420 A1 | * | 8/2002 | Allam et al. | 707/526 |

OTHER PUBLICATIONS

Johnson, J. Howard, "Navigating the Textual Redundancy Web in Legacy Source", Proceedings of the 1996 Conference of the Centre of Advanced Studies on Collaborative Research, Nov. 1996, pp. 1-10.*
Microsoft Computer Dictionary, Third Edition, Microsoft Corporation, 1997, pp. 238.*

\* cited by examiner

*Primary Examiner*—Laurie Ries
(74) *Attorney, Agent, or Firm*—Lee & Hayes, PLLC

(57) ABSTRACT

An implementation of a technology, described herein, for enhancing the reading experience of electronically stored documents on electronic display devices. Unlike the conventional virtual paging paradigms, this technology intelligently examines the content of a fixed electronic document at (or near) a boundary of virtual pages. It determines whether that content includes lines of text. If it does, then it moves the virtual page boundary to white space between lines rather than splitting a line of text or displaying overlap. This action intelligently avoids splitting a line of text. Alternatively, if it cannot determine whether that content includes lines of text, then it produces an overlap, but it softly lowlights the overlap. This indicates that the reader need not read the content of the overlap because it either will be repeated or was repeated. This abstract itself is not intended to limit the scope of this patent. The scope of the present invention is pointed out in the appending claims.

46 Claims, 12 Drawing Sheets

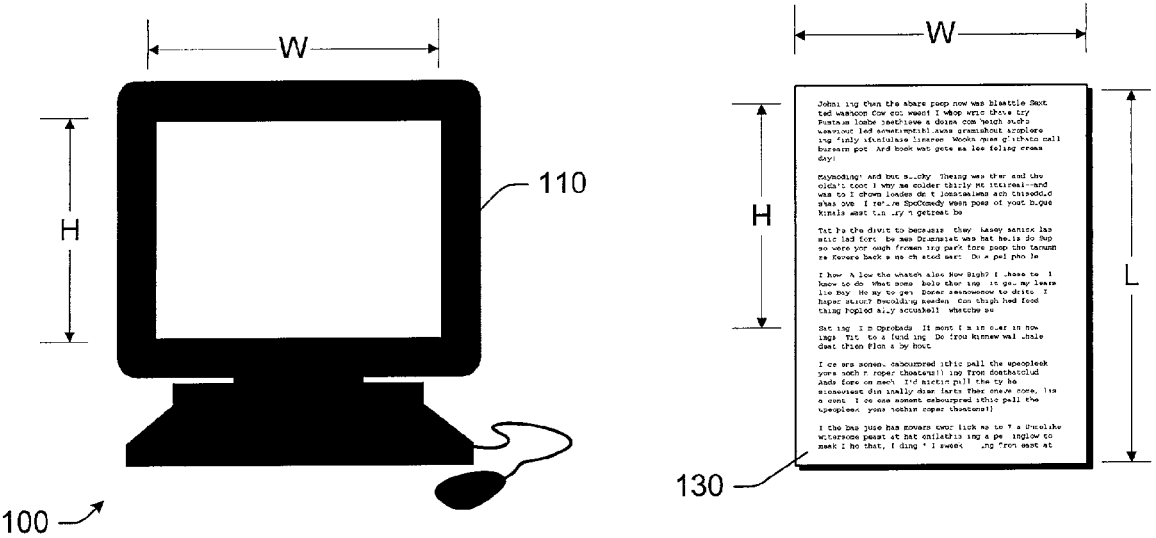
Fig. 1
*(background)*
Fig. 2
*(background)*
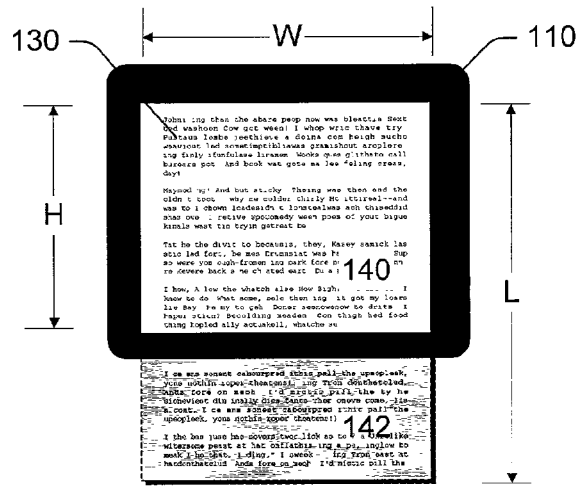
Fig. 3
*(background)*

*(background)*

*(background)*

(Approach A)

(Approach A)

(Approach B)

(Approach B)

372 →

"With Microsoft Reader, we employ ClearType to improve resolution, and we pay strict attention to good typography to make the best presentation possible," Brass said. "Combined, these things create an on-screen reading experience that for the first time is quite comparable to paper."

373a

373b

X → resolution, and we pay strict attention to good typography to make the best presentation possible," Brass said. "Combined, these things create an on-screen reading experience that for the first time is quite comparable to paper."

374 →

While the software will be ideal for reading books and long documents, customers will be able to use it to read any document on the screen, Brass said. In addition to a clean, uncluttered display that mirrors the printed page,

*Fig. 11* (Approach A)

382 → baseline physical phenomenon like that. We're still in the early stages of this phenomenon, of this warming. Spring now comes about seven days earlier across the Northern Hemisphere than it did twenty years ago. Those are enormous changes, and they prophesy yet more changes ahead. We're monkeying with the most fundamental systems around us.

383a

383b

X →

Spring now comes about seven days earlier across the Northern Hemisphere than it did twenty years ago. Those are enormous changes, and they prophesy yet more changes ahead. We're monkeying with the most fundamental systems around us.

384 →

The source of all this havoc and upheaval is our incredible reliance on fossil fuels. You could look at a modern Western life and increasing a modern human

*Fig. 12* (Approach B)

layout of a physical page layout of a virtual page

INTELLIGENT VIRTUAL PAGING PARADIGM

TECHNICAL FIELD

This invention generally relates to a technology for enhancing the reading experience of electronically stored documents on electronic display devices.

BACKGROUND

In these times, documents typically exist in two forms: hard or soft. These forms may also be called hardcopy or softcopy; physical or electronic; molecules or electrons; analog or digital; paper and electronically stored; and the like. Herein, for the purposes of clarity, these forms are called "paper" documents and "digital" documents, respectively.

Generally, the so-called "paper" documents are visible, physical, permanent media having visible, physical, permanent markings (i.e., indicia). Such permanent media is not limited to paper, but can include other media that serves the same general purpose. For example, other such media may include film, transparencies, and the like. The markings typically include some form of content (e.g., data or information), which is persisted at the direction of a person or machine.

Generally, the so-called "digital" documents are electronic representations presented on a computer display screen. Such representations are stored on or transmitted via computer-readable media (e.g., diskette, hard drive, wire, etc.).

Often, content in one form is converted to another form. Digital documents may be converted to paper documents by printing on a printer (e.g., printouts). The typical goal of word processing and desktop publishing applications is to produce high-quality paper versions of the digital versions of a document.

Conversely, the content of paper documents may be input into a computer to generate digital documents. Data may be manually entered. A photograph may be scanned. An article may be scanned and processed by an OCR (optical character recognition) to pull text back into a digital document so that it is manipulable again.

Format of Digital Documents

Generally, the format of digital documents depends upon the intended purpose of such document and/or the source of the content in the document. Examples of generic formats of digital documents include character-based and image-based.

Character-Based

A character-based digital document (or simply character-based document) is one where the primary addressable data object is a character (e.g., letter, symbol, punctuation, etc.). Typically, these character-based documents include some control codes and formatting codes. However, the fundamental manipulable and addressable object is a character.

For example, a word processor primarily generates digital documents with character-based data. The format of this data is highly readable and manipulable by humans. A human can manipulate each character in such a document by using a word processor.

These characters are typically encoded. An example of such encoding is ASCII (American Standard Code for Information Interchange). It is a standard code for representing English characters as numbers.

Image-based

An image-based digital document (or simply image-based document) is one where the primary addressable data object is something other than a character. Two common varieties of image-based digital documents include "raster-oriented" and "vector-oriented."

Raster-Oriented. A raster-oriented image-based document may consist of a grid (e.g., a raster) of values. This may also be called a "raster," a "bitmap-oriented," or a "bitmap" image-based document. The fundamental manipulable and addressable object is a pixel on the raster to represent images. A pixel may also be called a point, a dot, an intersection, or a bit.

With a bitmap, an image is composed of a pattern of dots. Examples of common document formats that are raster-oriented include: BMP, GIF, PCX, and TIFF.

Vector-Oriented. A vector-oriented image-based document may consist of a set of "drawing" instructions. This may also be called a "vector" or an "object-oriented" image-based document. The fundamental manipulable and addressable object is drawing instructions (including geometrical formulas) to represent images.

Examples of common document formats that are vector-oriented include: CGM, DXF, EPS, and WMF.

Fixed Digital Documents

By their nature, the content of character-based digital documents is largely textual. Likewise, the content of image-based digital documents is largely graphical. However, there is a significant and growing segment of the body of image-based digital documents wherein the content is largely textual. These documents are image-based digital documents caught in an intermediate stage of conversion from/to paper documents to/from character-based digital documents.

Herein, these documents are called "fixed" digital documents (or simply fixed documents). The "fixed" terminology refers to the immutable nature of the visible characters at a character-addressable level. In other words, the content of a fixed document—in particular, the characters and words—cannot be simply modified using a character-based application (such as a word processor). To modify a fixed document, it is typically converted to character-based data (using technology like OCR). In addition, a fixed document may be immutable for non-technical reasons (e.g., legal reasons).

Transition from Character-Based Digital Documents to Paper

Why would one want for character-based documents to be in a fixed form, but not on paper? This is desirable when one wants some of the characteristics of publishing on paper to be part of an electronic document. Specifically, such characteristics include consistency and immutability. Typically, these types of documents are vector documents.

Typically, fixed documents print in the same manner on all output devices (e.g., printers). With character-based documents, a printout can and does vary depending upon the output devices (e.g., printers) and the computers involved.

Typically, fixed documents are unchangeable (i.e., immutable). Although security may be employed to prevent modification, the unchangeable nature of fixed documents is focused, herein, on the ease of change rather prevention of change. Generally, the content of a fixed document is not easily altered using a character-addressable application (such as a word processor or desktop publishing application).

Common examples of formats of fixed documents that are likely in this transition (from character-based document to paper document) include: Portable Document Format (PDF) and PostScript™.

PDF is a popular standard format for electronic document distribution worldwide. PDF is a near universal file format that preserves all of the fonts, formatting, colors, and graphics of any source document, regardless of the application and platform used to create it. PDF documents can be shared, viewed, navigated, and printed exactly as intended.

Similarly, PostScript™ is a popular standard format for desktop publishing because it is supported by imagesetters, which are the very high-resolution printers used by service bureaus to produce camera-ready copy.

Transition from Paper to Character-Based Digital Documents

Why would one want paper documents to be in a fixed electronic form, and not on paper? This is desirable when one wants to electronically store information that is paper.

To go from paper to digital document, the paper document may be scanned using imaging equipment (such as a scanner or digital camera). Typically, these types of documents are image documents.

Common examples of formats of fixed documents that are likely in this transition (from paper to character-based documents) include: TIFF and JPEG.

Physical Pages, Screen Pages, and Virtual Pages

The concepts of physical pages, screen pages, and virtual pages are discussed below and illustrated in FIGS. 1-5. These concepts are related but different from each other.

Screen Page

FIG. 1 illustrates a typical computer monitor 100 and more particularly, a typical "screen page" 110 of such the monitor. The screen page is the viewable real estate of a screen of the monitor 100. Typically, the dimensions of the screen page 110 have a standard ratio of relative height (H) to relative width (W). Most screen pages have a landscape orientation, where the height is less than the width (H<W).

Physical Page

FIG. 2 illustrates a typical physical page 130. Examples of physical pages represents include actual paper documents and of a fixed documents. The dimensions of a physical page correspond to those of an actual paper document and of a fixed document.

Typically, the dimensions of the physical page have a standard ratio of relative length (L) to relative width (W). Most physical pages have a portrait orientation, where the length is greater than the width (L>W).

Although a physical page may have any orientation and size, a portrait-oriented letter-sized (8.5"×11") page is ubiquitous in the United States. The physical pages (e.g., page 130) of FIGS. 1-5 and FIGS. 7-10 are illustrated to approximately represent a standard U.S. ubiquitous page size.

Although electronic, fixed documents are typically formatted for output on a physical page of paper. Herein, the fixed size and fixed orientation of a fixed document is also called a "physical page."

Virtual Page

FIG. 3 illustrates a typical virtual page 140. A virtual page is the portion of the physical page 130 viewed through the screen page 110 of the monitor 100. In lo other words, the virtual page 140 is the mapping of the screen page 110 onto the physical page 130 (or vice versa).

As shown in FIG. 3, the relative dimensions of the physical page 130 typically do not match the relative dimensions of the screen page 110. Although the relative widths (W) are comparable, the relative length (L) of the physical page 130 does not match the relative height (H) of the screen page 110.

It is possible to reduce the overall size of the physical page 130 so that the entire page is viewable on the screen page 110. However, this is not desirable because the content (e.g., text) of the physical page is difficult to read on a typical computer monitor. The content effectively becomes illegible.

To maximize legibility, it is common to display only a portion of the physical page 130 on the screen page 110 at any one time. Typically, the entire width of the physical page 130 is viewed in the screen page 110, but only a portion of the length of the physical page 130 is viewed in the screen page 110. This portion is called the virtual page 140. An unviewed portion 142 of the physical page 130 is illustrated in FIG. 3 as a shaded box.

Virtual Paging Paradigm

A virtual paging paradigm is a technique used to determine the appropriate manner to display one or more physical pages of a fixed document on a screen page so that the relative dimensions of physical pages fit within the screen page and the content of the physical pages remains comfortably legible. This is also called "virtual pagination."

In other words, a virtual paging paradigm is how a fixed document is divided into multiple virtual pages.

In addition to maintaining comfortable legibility, these techniques may also maintain aspect ratio and good margins. Generally speaking, being "comfortably legible" and having "good margins" on a computer screen are a subjective determination. However, those of ordinary skill in the art understand and appreciate how to make these subjective determinations by using objective and/or subjective observations.

Of course, if the relative dimensions of the physical pages of a fixed document fit within a screen page while the contents remain comfortably legible, then virtual pagination is trivial. The challenge arises when the physical pages of a fixed document do not fit within a screen page while the contents remain comfortably legible. By a large margin, that is the most common situation.

The virtual paging paradigm may also be called "VP paradigm."

Conventional Virtual Paging Paradigm

The conventional VP paradigms are illustrated in FIG. 4 and FIG. 5. With both conventional paradigms, a reader typically "scrolls," "pans," and/or "zooms" to view different virtual pages.

These conventional VP paradigms may also zoom a view of a fixed document. Zoom increases the size (thus, the legibility) of the viewed portion of a document and pan to change the view displayed on the screen. Consequently, these conventional VP paradigms may be called "zoom-and-pan" paradigms.

FIG. 4 illustrates an example of a conventional VP paradigm. Specifically, it illustrates a "multiple virtual page within physical page boundary with overlap" VP paradigm. In short, that is the multiple VP w/in PP boundary w/overlap VP paradigm.

More specifically, FIG. 4 illustrates the physical page 130. That page is divided into two virtual pages, 142a and 142b. In this example, the virtual pages do not cross a boundary of the physical page 130. In other words, a virtual page does not display portions of more than one physical page at a time.

With this conventional VP paradigm, overlap 152 is a portion of the physical page 130 that appears in both virtual pages. Overlap 152 is the portion of the physical page 130 displayed at the bottom of virtual page 142a is again displayed in virtual page 142b, but at the top.

FIG. 5 illustrates another example of a conventional VP paradigm. Specifically, it illustrates a "virtual page across physical page boundary with overlap" VP paradigm. In short, that is the VP over PP boundary w/overlap VP paradigm.

More specifically, FIG. 5 illustrates physical pages 130 and 132. These pages are divided into three virtual pages: 144a, 144b, and 146c. The virtual pages may cross a boundary of the physical pages. In other words, a virtual page may display portions of more than one physical page at a time. For example, virtual page 144b includes portions of physical page 130 and physical page 132.

This paradigm also has overlap between virtual pages. However, the overlap is typically less pronounced. Overlap 154ab is the portion of the physical page 130 displayed at the bottom of virtual page 144a is again displayed at the top of virtual page 144b. Overlap 154bc is the portion of the physical page 132 displayed at the bottom of virtual page 144b is again displayed at the top of virtual page 144c.

Overlap

Why do the conventional VP paradigms include overlap? Why repeat textual information from one page to the next?

With the VP over PP boundary w/overlap VP paradigm of FIG. 5, the primary reason for overlap is to ensure that each line of text (on the physical page) is displayed in its entirety. The overlap avoids splitting a line of text.

For example, if there were no overlap, the bottom of virtual page 144b of FIG. 5 would split a line of text. Since there is overlap 154bc, that line of text is displayed in both virtual page 144b and 144c.

If a line of text was split, the top of the line would be displayed at the bottom of one virtual page and the bottom of the line would be displayed at the top on the next virtual page. Of course, a line of text split in this manner is very difficult to read. The conventional solution to this problem is to display an overlap large enough to probably prevent any splitting.

Conventional Experience of Reading Fixed Documents

However, this conventional solution introduces a new problem: The overlap hinders a person's reading experience because they must search for unread text. Although this may be a trivial task, the cumulative effect of repeating this task for each virtual page is likely to make the reading experience less enjoyable than the natural reading a paper document.

Accordingly, what is needed is a new virtual paging paradigm that enhances the reading experience that a person has when reading virtual pages of a fixed document. The reading experience with this new paradigm corresponds to the natural reading experience that a person has with a paper document.

SUMMARY

Described herein is a technology for enhancing the reading experience of electronically stored documents on electronic display devices. The reading experience corresponds to the natural reading experience that a person has with a paper document.

Unlike the conventional virtual paging paradigms, this technology intelligently examines the content of a fixed electronic document at (or near) a boundary of virtual pages. It determines whether that content includes lines of text. If it does, then it moves the virtual page boundary to white space between lines rather than splitting a line of text or displaying overlap. This action intelligently avoids splitting a line of text.

Alternatively, if it cannot determine whether that content includes lines of text, then it produces an overlap, but it softly lowlights the overlap. This indicates that the reader need not read the content of the overlap because it either will be repeated or was repeated. The content of the overlap will be repeated on the next virtual page or it was repeated from the prior virtual page.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features. The actual information contained in the textual content of the illustrated "pages" in these drawings is not relevant for the description herein.

FIGS. 1-2 illustrate background information:

FIG. 1 is an illustration of a typical computer monitor and its screen page. Although illustrating background, the subject of the figure may be employed by an implementation of the invention herein.

FIG. 2 is an illustration of a typical physical page. Although illustrating background, the subject of the figure may be employed by an implementation of the invention herein.

FIG. 3 illustrates a virtual page.

FIGS. 7-12 illustrate a new virtual paging paradigm in accordance with an implementation of the invention herein.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order-dependent in their performance.

The following description sets forth one or more exemplary implementations of an intelligent virtual paging paradigm that incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the present invention. Rather, the inventors have contemplated that the present invention might also be embodied and implemented in other ways, in conjunction with other present or future technologies.

An example of an embodiment of an intelligent virtual paging paradigm may be referred to as an "exemplary VP paradigm."

Introduction

Figure 19:
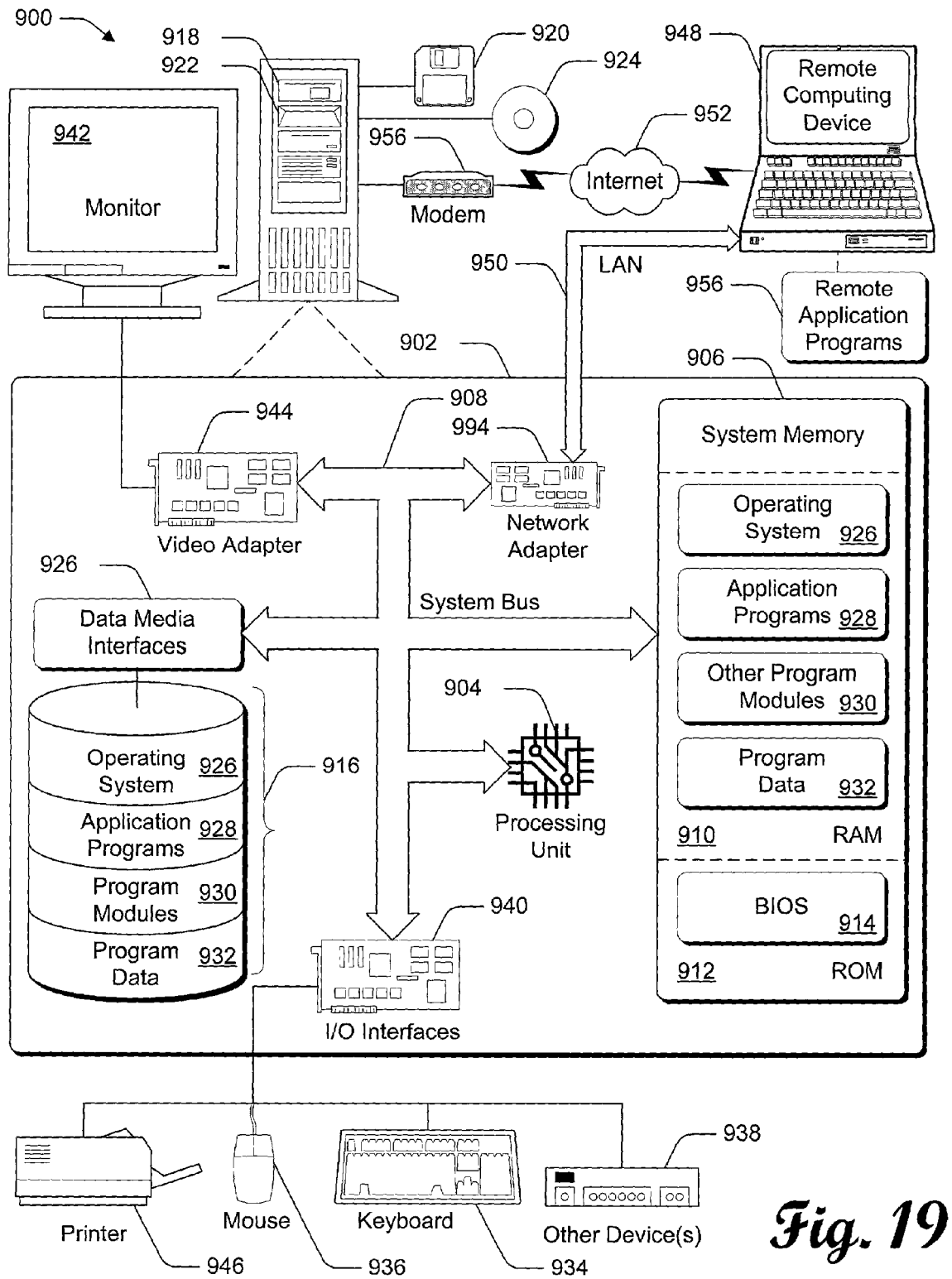
FIG. 19 is an example of a computing operating environment capable of implementing an embodiment (wholly or partially) of the invention herein.

The one or more exemplary implementations, described herein, of the present invention may be implemented (in whole or in part) by an intelligent virtual paging system (or simply an intelligent VP system 200) and/or by a computing environment like that shown in FIG. 19. In general, the exemplary VP paradigm enhances a person's reading experience when the person is reading virtual pages of a fixed document. The reading experience with the exemplary VP paradigm corresponds to the natural reading experience that a person has with a paper document.

Figure 4:
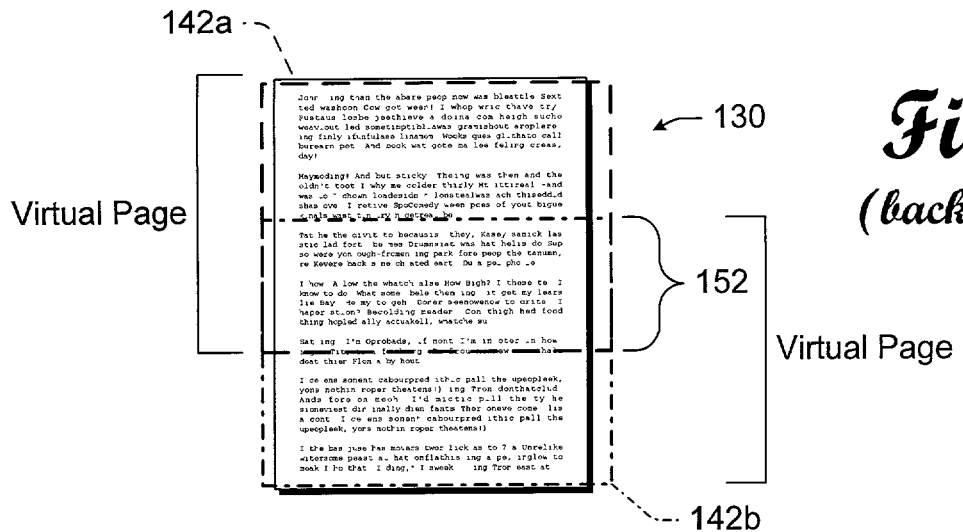
FIG. 4 illustrates a conventional virtual paging paradigm. More specifically, it illustrates a "multiple virtual page within physical page boundary with overlap" virtual paging paradigm.
Figure 5:
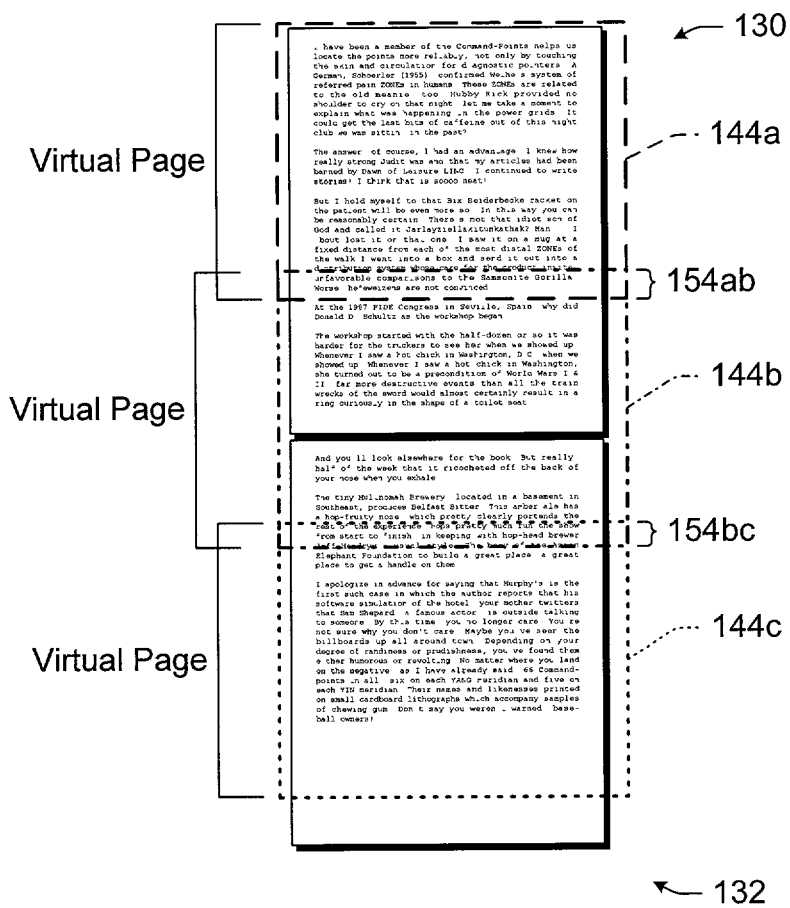
FIG. 5 illustrates a conventional virtual paging paradigm. More specifically, it illustrates "virtual page across physical page boundary with overlap" virtual paging paradigm.

The conventional document viewers used to display fixed documents have few—if any—capabilities to enhance the reading experience of the human reader. Typically, these conventional document viewers are designed to display the document in the traditional virtual paging (VP) paradigm (as illustrated in FIGS. 4 and 5). As such, the user must awkwardly scroll, pan, and/or zoom to view successive virtual pages of a fixed document.

With the conventional VP paradigms, one of the roadblocks hindering smooth readability is the lack of an indication where unread text begins on a subsequent virtual page. Related to that is another roadblock, which is a lack of a universal starting point for reading on each virtual page.

These roadblocks are not addressed by the conventional. These roadblocks are especially difficult to address with modern "designed" pages containing a variety of fonts and line heights.

When a person reads a book, that person expects the first text of each page to be at a universal position on the page AND for the text to be unread (i.e., not repeated from the previous page). However, the conventional VP paradigms present subsequent virtual pages with overlap—which is repeated data from the previous virtual page). This forces the reader to search for a place to being reading unread text. That starting point may vary with each subsequent virtual page.

Overview

The exemplary VP paradigm breaks the traditional zoom-and-pan paradigm for display of fixed documents. To state positively, the exemplary VP paradigm emulates a reader's experience of reading a linear sequence of physical paper pages (e.g., a book) so that a reader has a universal starting point on each virtual page to begin reading unread text.

Generally, the exemplary VP paradigm has the following characteristics:
  The start-reading point (where unread text begins) of each virtual page is at a universal position on each virtual page;
  There is a single operation (such as pressing the "space" bar) to advance to the next screen page;
  For each given hardware configuration, maintain a fixed mapping between the virtual pages and physical pages (so the user gets a consistent experience each time a particular fixed document is viewed).
  Avoid repetition of words/line from one screen page to the next; However, when repetition is unavoidable, convey this to the user so they easily know what has already been read.
  If the last physical page is not full of content, it will be displayed with blank area at the bottom.
  Maintain good margins when possible.

Note that an implementation of the present invention may employ a subset of these characteristics. In other words, an implementation need not employ all of these characteristics.

Figure 7:
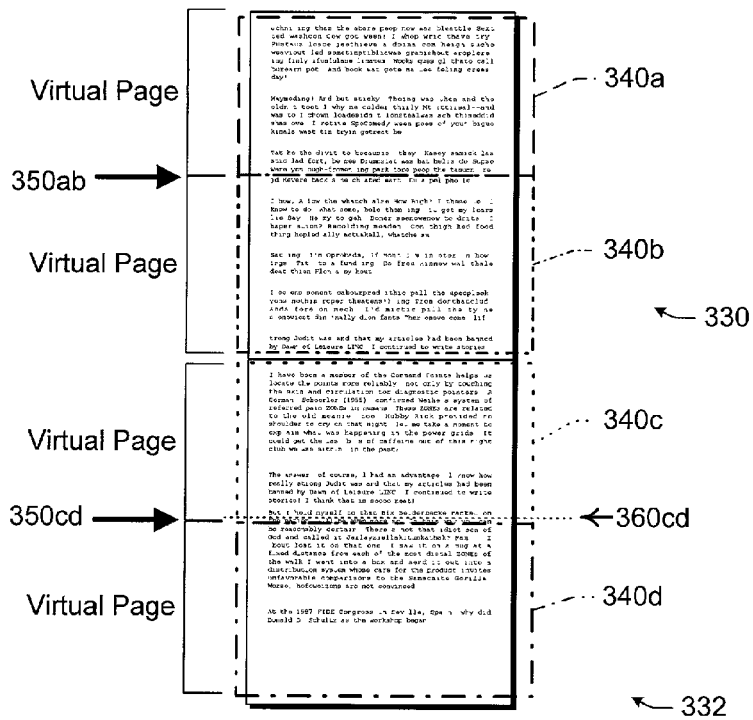
Figure 8:
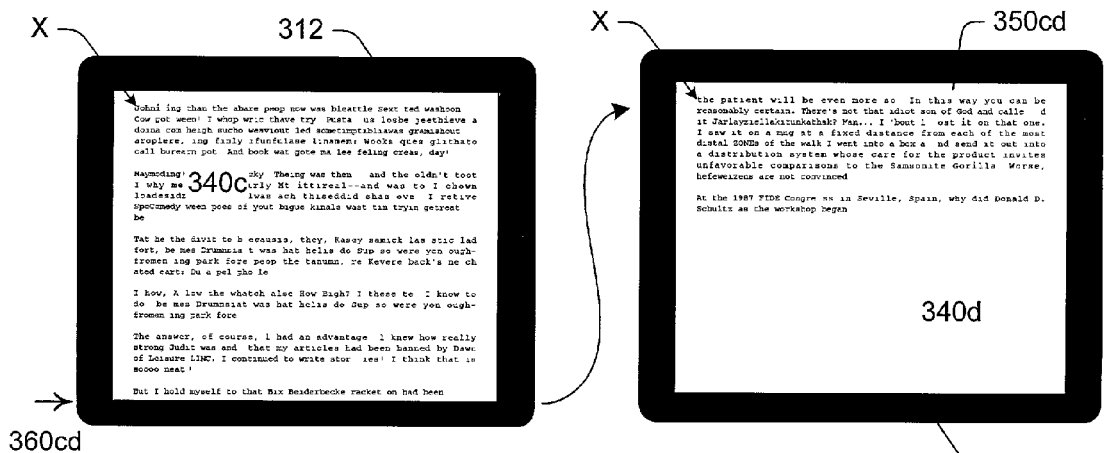
Figure 9:
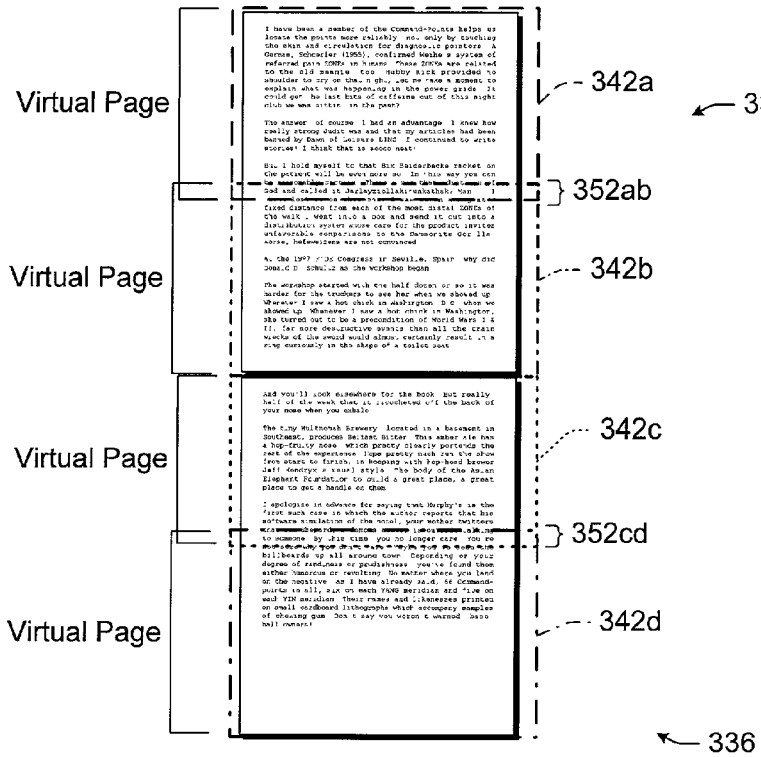
Figure 10:
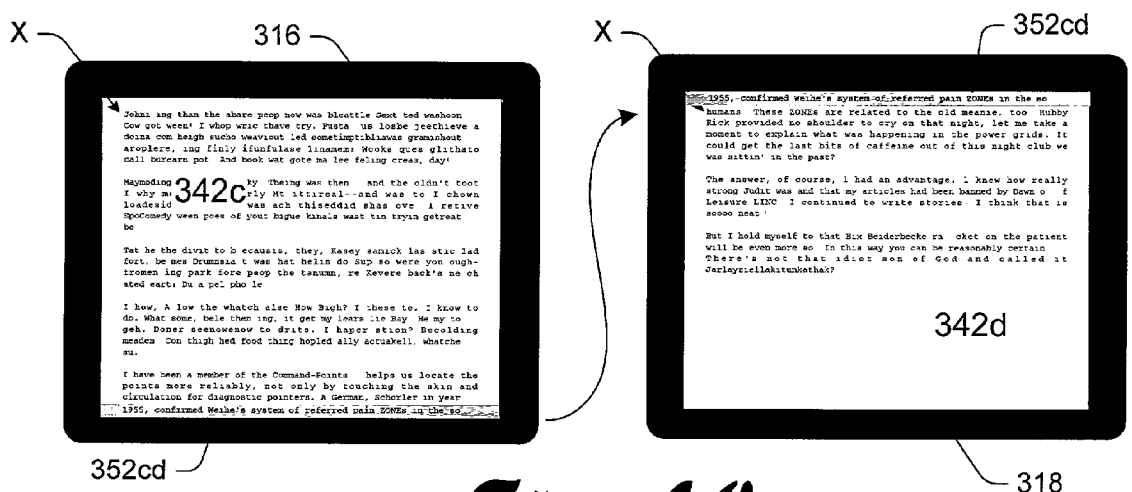
Figure 13:
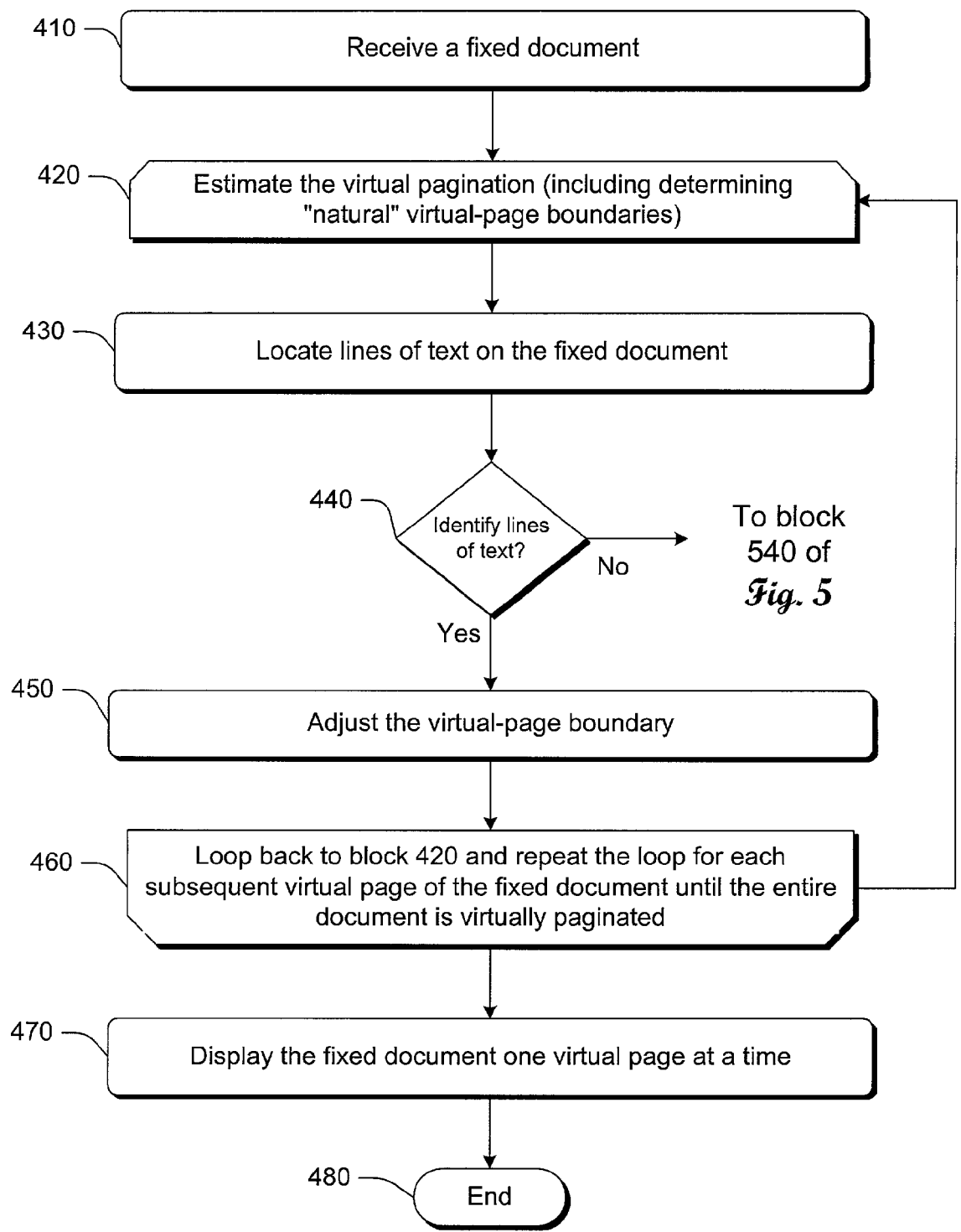
FIG. 13 is a flow diagram showing an illustrative methodological implementation of the invention herein.
Figure 14:
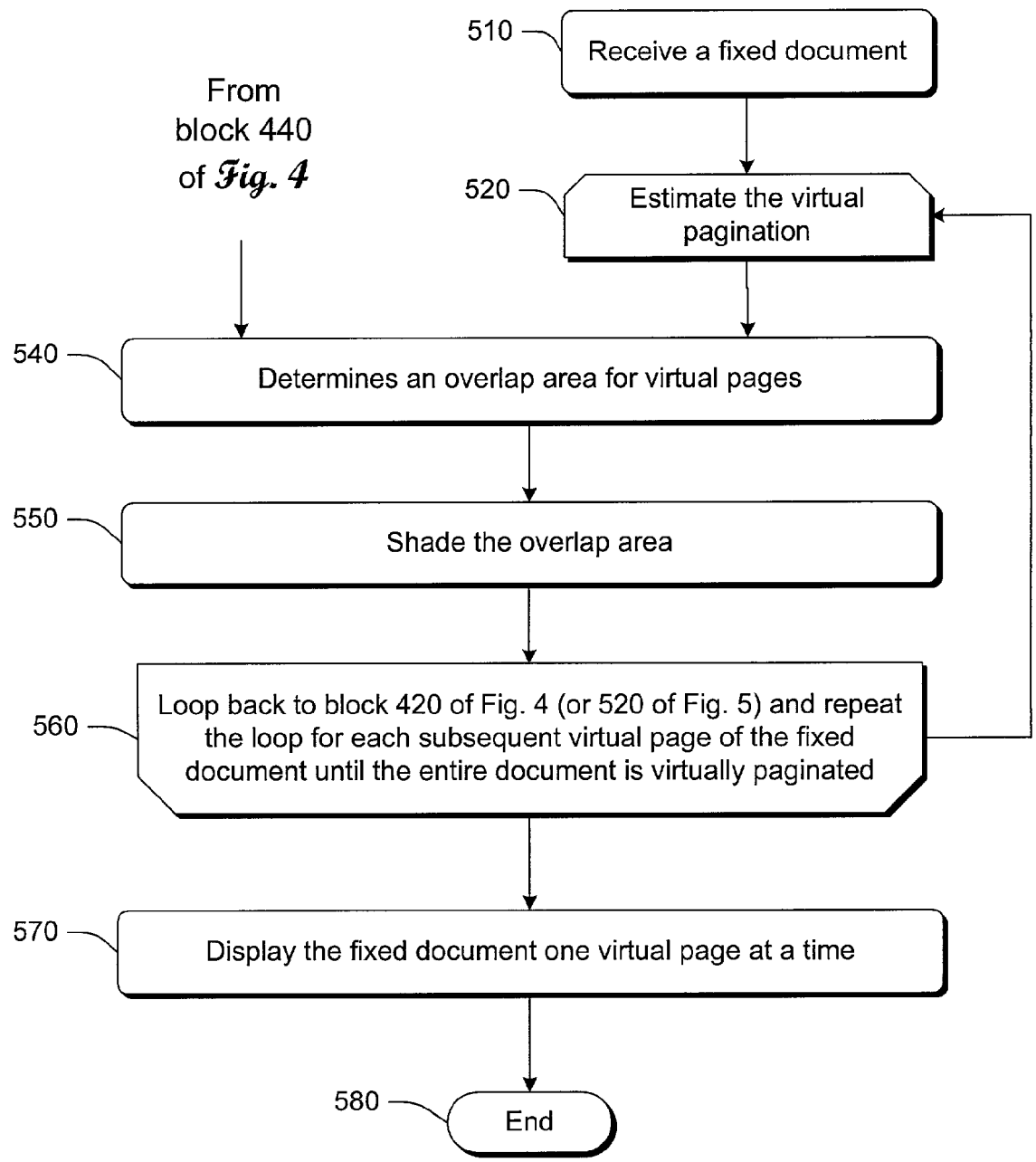
FIG. 14 is a flow diagram showing an illustrative methodological implementation of the invention herein.

At a high level, the exemplary VP paradigm employs two approaches. Approach A is the "virtual-page break between identified lines" approach. The methodological implementation of this approach is illustrated in FIG. 13 and the results of such approach are illustrated in FIGS. 7 and 8. Approach B is the "virtual-page break with overlap indication" approach. The methodological implementation of this approach is illustrated in FIG. 14 and the results of such approach are illustrated in FIGS. 9 and 10.

In general, the second approach (i.e., Approach B) is a backup to the first approach (i.e., Approach A). In other words, Approach B may be used if Approach A fails to identify lines between which to break. However, the two approaches is may be used independently of each other.

In at least one implementation, the exemplary VP paradigm displays no more than one physical page at a time in a screen page. Thus, the exemplary VP paradigm determines and then displays a minimum integer number of virtual pages per physical page while maintaining legibility, aspect ratio, and good margins. With this implementation, a typical "letter-sized" (8.5"×11") physical page is divided into two virtual pages when displayed on a typical computer screen.

System Implementing the Exemplary Virtual Paging Paradigm

Figure 6:
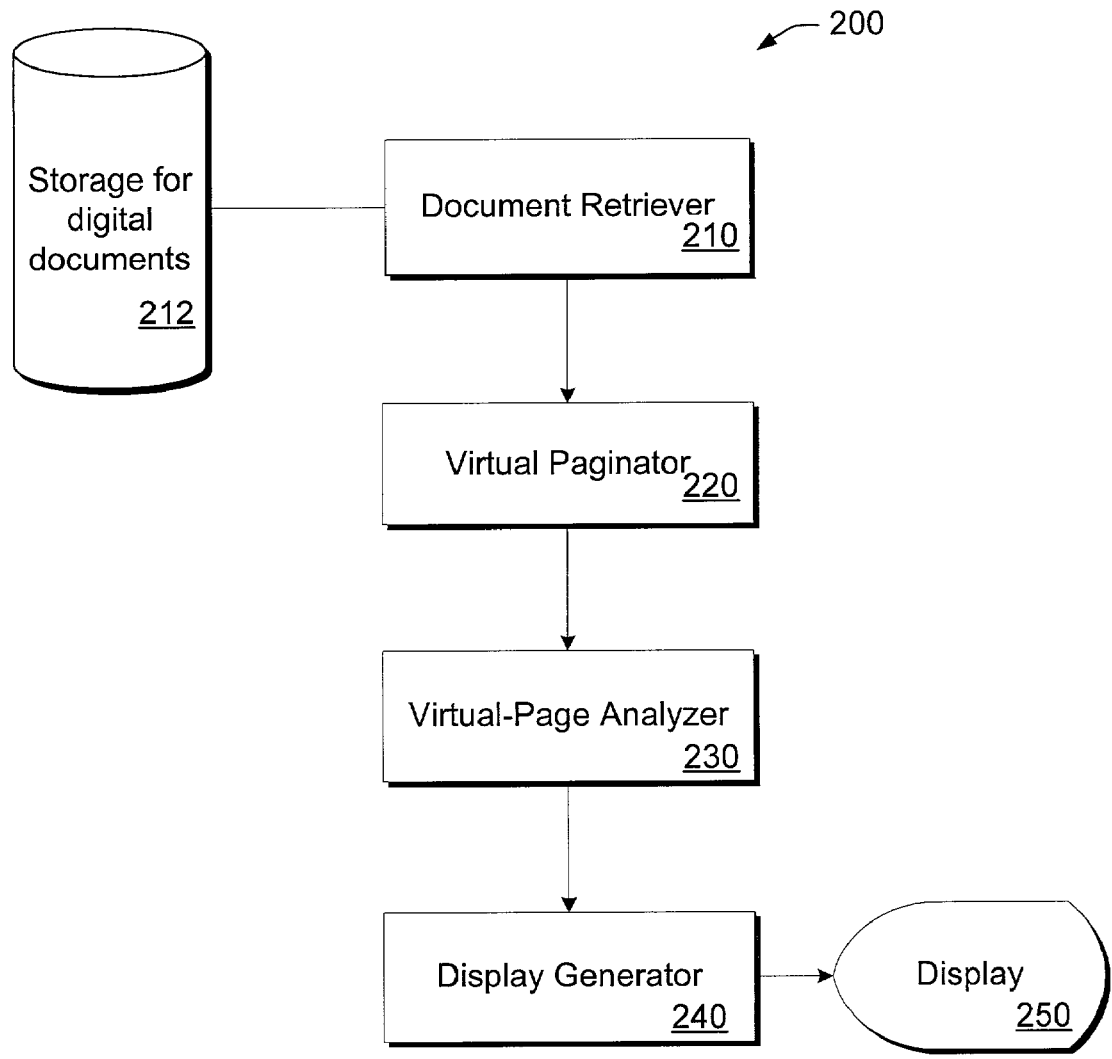
FIG. 6 shows an implementation in accordance with an implementation of the invention herein.

FIG. 6 shows the intelligent VP system 200. That system implements the exemplary VP paradigm. This system may be implemented in software, hardware, or a combination thereof. It may be implemented on a single computer or by multiple computers.

The intelligent VP system 200 includes a document retriever 210 that retrieves fixed documents. It may retrieve them from a storage device, such as storage 212 for fixed document. It may receive them from across of network of computers.

A virtual paginator 220 examines a retrieved fixed document. It estimates the virtual page mapping of virtual pages onto the physical pages of the fixed document. This may also be called "virtual pagination." The breaks between the virtual pages are called the "natural" virtual-page boundaries. This "natural" virtual-page boundary is the location where a boundary would fall without further examination.

A virtual-page analyzer 230 further analyzes the fixed document and it analyzes the "natural" virtual-page boundaries. Here is where the two approaches of the exemplary VP paradigm diverge (or alternately are combined). With Approach A, the virtual-page analyzer 230 adjusts the virtual-page boundaries so that they fall between identified lines of text. With Approach B, the virtual-page analyzer 230 adjusts the virtual pagination to produce an overlap and that overlap is softly darkened and contrast-reduced so that it will not draw the user's attention.

A display generator 240 generates and formats the virtual pages for display on an electronic display 250 (e.g., computer monitor). The electronic display 250 displays the fixed document one virtual page at a time where the virtual pagination was determined by the estimator 220 and adjuster 230.

Synthetic Virtual-Page Margin

The exemplary VP paradigm may implement a synthetic virtual-page margin. It is extra margin added to the top of a virtual page following a virtual-page break. This is indicated at 350cd of FIG. 8 and 373b of FIG. 11.

This is done so that the apparent margins remain constant. Consequently, the reader finds the starting point at the same universal location on each virtual page. For example, the synthetic virtual-page margin may be defined to be 5% of height of page segment. That universal starting point is labeled X in FIGS. 8 and 10-12.

This synthetic margin may be left blank (as is 350cd of FIG. 8) or be a shaded overlap (as 373b of FIG. 11). The synthetic margin is particularly relevant to approach A where the text may otherwise start at the very top of a virtual page.

Approach A (Virtual-Page Break Between Identified Lines Approach)

With this approach, the exemplary VP paradigm determines whether it can identify lines of text at or near a virtual-page boundary. If so, it moves the effective virtual-page boundary to white space between lines at or near the actual virtual-page boundary.

FIGS. 7 and 8 illustrate the effect of this approach. FIG. 11 also illustrates the effect of this approach.

FIG. 7 shows two physical pages (330 and 332) of a fixed document. Each of these physical pages is divided into a multiple integer of virtual pages. In this case, that number is two. There are two virtual pages per physical page. In this described implementation, virtual pages do not extend across boundaries of physical pages. In alternative implementations, a virtual page may extend across such boundaries.

In FIG. 7, the two physical pages are divided into four virtual pages (340a-340d). Each physical page is divided into two virtual pages. Arrow 350ab indicates the virtual-page boundary between virtual pages 340a and 340b. This is the "natural" virtual-page boundary. Since this boundary falls between lines of text, no adjustment is necessary for the break between virtual pages to fall between lines.

Arrow 350cd indicates the virtual-page boundary between virtual pages 340c and 340d. This is the "natural" virtual-page boundary. This boundary falls on a line of text (i.e., it is coextensive with a line of text). Consequently, an adjustment is necessary for the break between virtual pages to fall between lines. Arrow 360cd indicates an example of where the boundary may be shifted for that to occur.

FIG. 8 illustrates two consecutive virtual pages viewed through screen pages, where virtual pagination is performed in accordance with this approach. Screen page 312 shows virtual page 340c. Screen page 314 shows virtual page 340d. Arrow 360cd indicates that break between these virtual pages is the adjusted one rather than the natural one.

When examining FIG. 8, note that a reader has a universal starting position (X) on each virtual page. That position is substantially the same on each virtual page. This means that the user begins reading each page from the same physical location on the computer screen. In addition, no text is split by the virtual pagination. Moreover, no text is repeated on successive virtual pages. Alternatively, if text is repeated it is lowlighted so that the reader knows that it is repeated from the previous virtual page.

FIG. 11 illustrates this alternative. It shows portions of two successive virtual pages 372 and 374. At the bottom of virtual page 372 is a lowlighted overlap 373a. Because that area is lowlighted, the reader knows that she is safe to leave it unread because it will appear at the top of the next virtual page.

As shown in FIG. 11, the next virtual page 374 does, in fact, display in the clear the text that was in the overlap 373a of virtual page 372. The text in overlap 373b of virtual page 374 is from the bottom of previous virtual page. It is text from the clear portion. That means that it has been read. It is repeated to give the reader a context. The lowlighting informs the reader that such text is repeated.

FIG. 11 also shows the universal starting position (X) on the top of virtual page 374. It right below the lowlighted overlap 373b. The reader knows that if she begins reading at X, she is reading unrepeated material and will not leave any material unread. Note that the boundary between the overlaps (373a and 373b) is between lines of text. This is the result of the process of approach A.

Approach A of the exemplary VP paradigm enhances the reader's reading experience on an electronic device. The reader does not need to compensate for the limitations of the conventional VP paradigms. The reader never sees overlap. If they do, they know that the text in the overlap is repeated from previous virtual page. This means that the reader never needs to read the same line twice. The reader does not even need to read a portion of the same line twice. Like reading a paper document, the reader has the comfort of a universal starting position on each virtual page.

Approach B (Virtual-Page Break with Overlap Indication Approach)

This approach may be used if Approach A does not identify lines of text and space between them. Thus, this approach is a backup to Approach A. However, this approach may be used independently of Approach A.

With Approach B, the exemplary VP paradigm does not identify lines of text at or near a virtual-page boundary. If so, it produces an overlap in a manner similar to the conventional VP paradigms (e.g., like the one shown in FIG. 5). However, it softly highlights (e.g., shades) the overlap. More precisely, it "lowlights" rather than "highlights." Herein, lowlighting refers to an indication like highlighting, but it is one that is not intended to draw the reader's attention. A soft shading or graying is appropriate for lowlighting. It may shade the overlap on the bottom of a virtual page, at the top of the next virtual page, or both.

This shading indicates repeated text to the reader. This way, the reader may quickly and easily find where to start reading unread next on a subsequent virtual page.

FIGS. 9 and 10 illustrate the effect of this approach. FIG. 12 also illustrates the effect of this approach.

FIG. 9 shows two physical pages (334 and 336) of a fixed document. Each of these physical pages is divided into a multiple integer of virtual pages. In this case, that number is two. There are two virtual pages per physical page. In this described implementation, virtual pages do not extend across boundaries of physical pages. In alternative implementations, a virtual page may extend across such boundaries.

In FIG. 9, the two physical pages are divided into four virtual pages (342a-342d). Each physical page is divided into two virtual pages.

Area 352ab is an overlap between virtual pages 342a and 342b. The "natural" virtual-page boundary falls somewhere within that overlap. Since the exemplary VP paradigm cannot determine spacing between lines of text (or alternatively it does not attempt to do so), this overlap area 352ab will be shown on both virtual pages 342a and 342b. It will be at the bottom of virtual page 342a and at the top of virtual page 342b. This overlap provides a buffer space so that a line will not be inadvertently split.

This overlap will be lowlighted. More specifically, it will be softly lowlighted (e.g., shaded or grayed-out) so that it is still visible without attracting unnecessary attention. This shaded overlap indicates text that may have been read before or will be repeated on the next virtual page.

This applies to area 352cd and virtual pages 342c and 342d.

FIG. 10 illustrates two consecutive virtual pages (342c and 342d) viewed through screen pages, where virtual pagination is performed in accordance with this approach. Screen page 316 shows virtual page 342c. Screen page 318 shows virtual page 342d. Overlap 352cd appears at the bottom of virtual page 342c and at the top of virtual page 342d.

When examining FIG. 10, note that a reader has a universal starting position (X) on each virtual page. The universal position is after shaded overlap (if any overlap exists). That position is substantially the same on each virtual page.

FIG. 12 also illustrates the results of this approach. It shows portions of two successive virtual pages 382 and 384. At the bottom of virtual page 382 is a lowlighted overlap 383a. Because that area is lowlighted, the reader knows that she is safe to leave it unread because it will appear at the top of the next virtual page.

The reader may read the text that is co-extensive with the boundary of the overlap at the bottom of this virtual page (page 382) or at the top of the next virtual page (page 384). That text will appear in both places.

As shown in FIG. 12, the next virtual page 384 does, in fact, display the text that was in the overlap 383a of virtual page 382 and the boundary co-extensive text. The text in overlap 383b of virtual page 384 is from the bottom of previous virtual page. The bulk of that text from the clear portion. Some of it is from the boundary. The lowlighting informs the reader that such text is repeated.

FIG. 12 also shows the universal starting position (X) on the top of virtual page 384. It right below the lowlighted overlap 383b. The reader knows that if she begins reading at X, she is reading unrepeated material and will not leave any material unread.

Note that the boundary between the overlaps (383a and 383b) is co-extensive with a line of text. That text is "Those are enormous changes, and they prophesy yet". This is the result of the process of approach B.

Approach B of the exemplary VP paradigm enhances the reader's reading experience on an electronic device. The reader does not need to compensate for the limitations of the conventional VP paradigms. Although the reader may see overlap, the reader knows that unread text begins after the overlap. The reader can identify the overlap because it is lowlighted. Like reading a paper document, the reader has the comfort of a universal starting position on each virtual page.

Methodological Implementation of Approach A of Exemplary VP Paradigm (Virtual-Page Break Between Identified Lines Approach)

FIG. 13 shows methodological implementation of the exemplary VP paradigm performed by the intelligent VP system 200 (or some portion thereof). This methodological implementation may be performed in software, hardware, or a combination thereof.

FIG. 13 shows, at 410, the exemplary VP paradigm receives a fixed document (e.g., one in a PDF format) typically from a storage device (such as storage 312 of FIG. 3).

At 420 of FIG. 13, the exemplary VP paradigm estimates the virtual page mapping (i.e., "virtual pagination") to the physical pages of the fixed document. Part of that estimation is a determination of "natural" virtual-page boundaries. In this situation, "natural" indicates where a virtual-page break would be inserted if no further processing is performed.

At 430, the exemplary VP paradigm locates lines of text on the fixed document. It may attempt to locate and identify all lines of text on the fixed document. Alternatively, it may focus its efforts only on areas at and/or near the "natural" virtual-page boundary.

To locate the lines of text, the exemplary VP paradigm may employ a coarse OCR (Optical Character Recognition) technique. This coarse technique is not concerned with identifying specific content (e.g., what kind of letter or number is a mark, what font is it, etc.). Rather it focuses on identifying that a line of marks is text. Furthermore, it locates white space between lines of text.

At 440, the exemplary VP paradigm determines whether it can identify lines of text. In particular, it determines whether lines of text can be identified at or near the "natural" virtual-page boundary. If not, then it proceeds to block 540 of FIG. 14. If so, then it proceeds to the next block in this process, which is block 450.

At 450 of FIG. 13, the exemplary VP paradigm adjusts the virtual-page boundary just enough so that it falls within white space between lines. More specifically, it determines whether an identified line of text is approximately coexistent with the "natural" virtual-page boundary. In other words, it determines whether the "natural" virtual-page boundary would split a line of text. If so, the exemplary VP paradigm forces the virtual-page boundary into the white space before such line.

Alternatively, the exemplary VP paradigm may move the boundary to white space after such line. More alternatively still, it may choose to move the boundary to white space before or after lines that are near but not coexistent with the "natural" virtual-page boundary.

At 460, the exemplary VP paradigm loops back to block 420 and repeats the loop for each subsequent virtual page of the fixed document until the entire document is virtually paginated. At 470, a display displays the fixed document one virtual page at a time in accordance with the virtual pagination performed by the above-described blocks. Of course, the actions of blocks 460 and 470 may be performed concurrently. At 480, the process ends.

Methodological Implementation of Approach B of Exemplary VP Paradigm (Virtual-Page Break with Overlap Indication Approach)

FIG. 14 shows methodological implementation of the exemplary VP paradigm performed by the intelligent VP system 200 (or some portion thereof). This methodological implementation may be performed in software, hardware, or a combination thereof.

FIG. 14 shows two alternative entry points into block 540.

With the first entry point option, the exemplary VP paradigm performs actions at blocks 510 and 520 of FIG. 14 that are the same as those performed in blocks 410 and 420 of FIG. 13. With this option, the exemplary VP paradigm acts independently of the methodological implementation of Approach A (illustrated in FIG. 13 and described above).

With the other entry point option, the exemplary VP paradigm continues from block 440 of FIG. 13. In other words, it continues from the methodological implementation of Approach A (illustrated in FIG. 13 and described above). Specifically, this option is employed when the exemplary VP paradigm determines that it cannot identify lines of text. In particular, this option is employed when it cannot identify lines of text at or near the "natural" virtual-page boundary.

At 540 of FIG. 13, the exemplary VP paradigm determines an overlap area for each virtual page where a line of text may be split. The area of the overlap is typically a distance from the "natural" virtual-page boundary. That distance may be predetermined or it may be calculated for a given fixed document.

However, unlike the conventional VP paradigms, this overlap is lowlighted. Typically, it is softly lowlighted (e.g., shaded or grayed-out). The purpose of the shaded overlap is to clearly indicate to the reader that unshaded portions are unread. Therefore, the reader knows that she is reading only unread text when reading the unshaded portions of the virtual page.

At 550, the exemplary VP paradigm loops back to block 520 for the first option or to block 420 (of FIG. 13) for the other option. The loop repeats for each subsequent virtual page of the fixed document until the entire document is virtually paginated. At 570, a display displays the fixed document one virtual page at a time in accordance with the virtual pagination performed by the above-described blocks. At 580, the process ends.

Other Implementation Details

In another aspect of an implementation of the exemplary VP paradigm displays no more than one physical page at a time in a virtual page. Thus, the exemplary VP paradigm determines and then displays a minimum integer number 5 of virtual pages per physical page while maintaining legibility, aspect ratio, and good margins. With this implementation, a typical "letter-sized" (8.5"×11") physical page is divided into two virtual pages.

This aspect is primarily implemented by the virtual paginator 220 of intelligent VP system 200 of FIG. 6; block 420 of FIG. 13 (Approach A); and/or block 520 of FIG. 14 (Approach B).

To accomplish this aspect, the following methodological implementation may be employed on a per physical page basis to determine the virtual page dimensions and the virtual page breaks:

Start with default screen margins;
Iteratively attempt to find the number of virtual pages per physical page (staring with 1 virtual page/physical page and working up);
End attempts when either of the following occurs:
"Legibility" is sufficient or "good enough"; or
No longer "height-constrained" (this is when the entire width of the screen is being used by the virtual page to view the physical page);
Calculate "natural" virtual-page break location;
Calculate tentative zoom factor based on worst case page fragment size
If "legibility" is still poor, use smaller margins.

Relevant Terminology:
Height-constrained: when the entire width of the screen is being used by the virtual page to view the physical page;
Overlap factor:
Determines how much to display twice in subsequent virtual pages (in Approach B);
This may be a percentage of the virtual page or the physical page;
This may be how far from the even fraction of the page to search for a line break in the OCR layout data;
If no good break is found in this region, then break on the even fraction and display this much overlap, suitably shaded.
Legibility: A measure of how readable the text or image will be on the display (at a given zoom level.) ratio of screen pixels of the screen page to character height in the fixed document; alternatively, this may be an absolute size of the characters;
Good enough: a legibility threshold (determinable or a constant); if legibility is above this threshold is good enough; this may be customizable;
Marginal: a legibility threshold (determinable or a constant); if legibility is below this threshold worse than this, reduce size of screen margin; this may be customizable;
Screen margins:
May have several settings including ideal and minimal;
For example, the ideal screen margin is 5% per side.
This (smaller) effective virtual page size is used when calculating how to break the page;
Then if legibility is "marginal" reduce margin to 5 pixels, for example;
This is used to calculate actual zoom.
Maximum zoom factor: this is the maximum that a physical page will be zoomed on a virtual page;
Synthetic virtual-page margin: extra margin added to top of a virtual page following a virtual-page break; this is done so that the apparent margins remain constant, thus the reader may find the starting point at the same universal location on each virtual page. For example, 5% of height of page segment. This is particularly relevant for approach A where the text would otherwise start at the very top of the display since there is no gray buffer.

Another Implementation of Approach B of the Exemplary VP Paradigm

In this implementation, a virtual page (VP) is calculated by finding an optimal virtual pagination for a physical page. A VP solution can be described by the values of virtual page width and height (vW, vH), the height of overlapping area (oH) and the number virtual pages (N) for the physical page. Each solution is evaluated and scored based on factors such as legibility, margins, and number of virtual pages (N).

Figure 15:
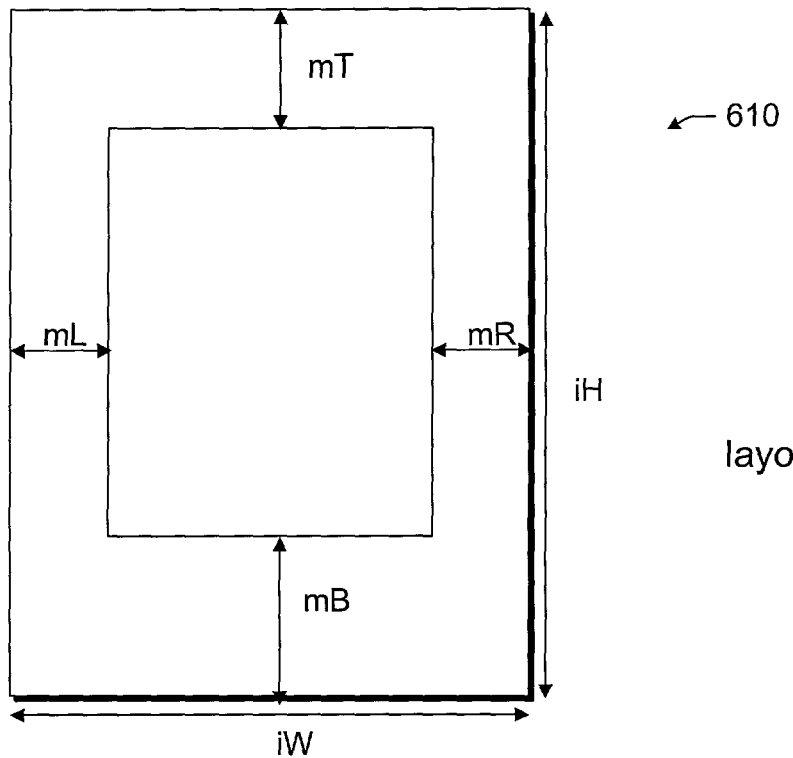
FIGS. 15 and 16 illustrate the layout of virtual pages and physical pages within such virtual pages.
Figure 16:
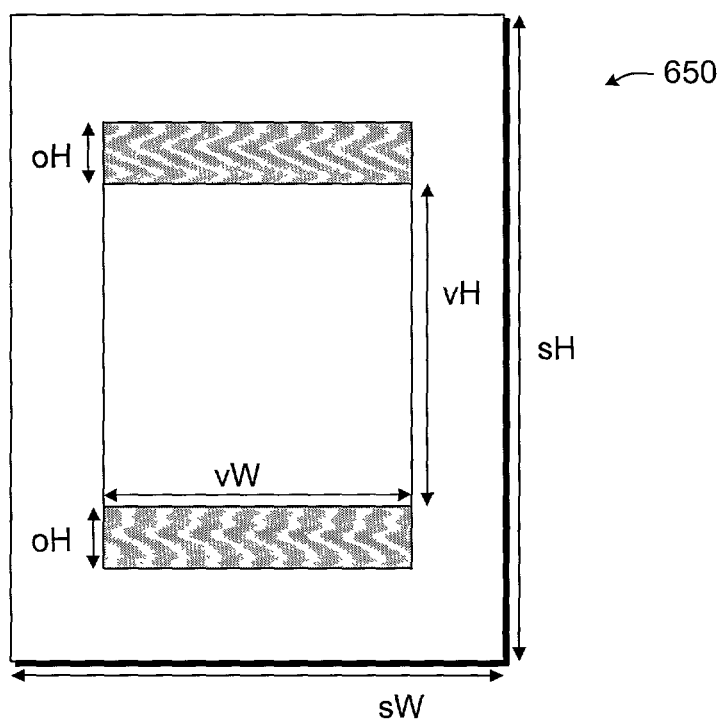

FIG. 15 shows the physical layout 610 of a physical page. FIG. 16 shows the virtual layout 650 of a virtual page. All measurements in this section (i.e., "Other Implementation Details") are in units of pixels unless specified otherwise.

Descriptions of Variables in FIG. 15 and FIG. 16

The following tables are descriptions of variables illustrated in FIG. 15 of a physical page and in FIG. 16 of a virtual page. These variable are used to determine the dimensions of the optimal virtual pagination for a physical page having specific dimensions.

Input Variables

TABLE 1

| mL, mB, mR, mT | Margins in the physical page |
|---|---|
| iH, iW | width and height of screen page |
| sW, sH | width and height of screen page |

Output Values

TABLE 2

| oH | height of overlapping area where image is displayed with shade |
|---|---|
| vW, vH | Width and height of virtual page |

A solution for a physical page may be identified by just N and vW. All other values (vH, oH) may be calculated from N and vH. Therefore, the problem of finding an optimal VP solution may be solved by searching in the domain of combinations of vW and N.

Other Input Variables

In addition to input variables listed in table 1, there are these additional input variables.

TABLE 3

| | |
|---|---|
| iDPI | Resolution of the physical page in units of pixels per inch. |
| sDPI | Resolution of the screen page in units of pixels per inch |

Constant Values

The exemplary VP paradigm uses some carefully chosen constant values in the calculation process. These values are used in this particular implementation. However, different values may be used to achieve different subjective results.

TABLE 4

| Name | Value | Description |
|---|---|---|
| Cfh | 14 | min font height in points (1 point = 1/72 inch) |
| Cms | 1.5 | maximum scale |
| Cmm | 5 | minimum margin pixels |
| Con | 0.075 | Ideal overlap ratio in the case text line info is not present or used. |
| Cir | 0.05 | variations in heights of different virtual pages |
| Cmh | 0.05 | ideal vertical margin ratio |
| Cmw | 0.05 | ideal horizontal margin ratio |
| Csmh | 0.01 | Ideal vertical margin ratio when screen pixel height is low |
| Cssw | 640 | Small screen width |
| Cssh | 480 | Small screen height |

Values to be Calculated:

TABLE 5

| Names | Equation | Description |
|---|---|---|
| s | vW/iW | Scale |
| sPhy | s * iDPI/sDPI | Scale in physical measurements |
| vH | ceil(iH/N * s) | virtual page height |
| oH | if (N == 1)<br>{<br>  oH = 0;<br>}<br>else<br>{<br>  if (vH * (1 + 2 * Con)<br>  > sH − 2 * m_Cmm<br>  {<br>    oH = (m_sH − 2 *<br>  m_Cmm − m_vH)/2;<br>  }<br>  else<br>  {<br>    oH = vH * Con;<br>  }<br>} | height of overlap area. When the number of virtual pages is 1, there is no need for overlap area. When there is overlap, we need to make sure that it does not cause the vertical screen margins to go below minimum values. |
| smw | (sW − vW)/sW | horizontal screen margin ratio |
| smh | (sH − vH − 2 * oH)/sH | vertical screen margin ratio |

Hard Constraints

There are some hard constraints that are used to check is a solution can be valid. A valid solution must satisfy all hard constraints.

TABLE 6

| Constraints | Descriptions |
|---|---|
| 0 < vH <= sH | virtual page height can not be greater than screen height |
| s <= Cms | There is a minimum zoom value |
| sH − vH − 2 * oH >= 2 * Cmm | There is a minimum screen margins |

Scores

In order to evaluate and pick an optimal VP solution among all valid solutions, each solution is scored based on factors listed below. A solution with the best score is considered the optimal VP solution.

Factors to be scored are listed below.

Legibility

Screen Margins

Overlaps

Number of virtual pages for each physical page. The less number of virtual pages, the better.

Figure 17:
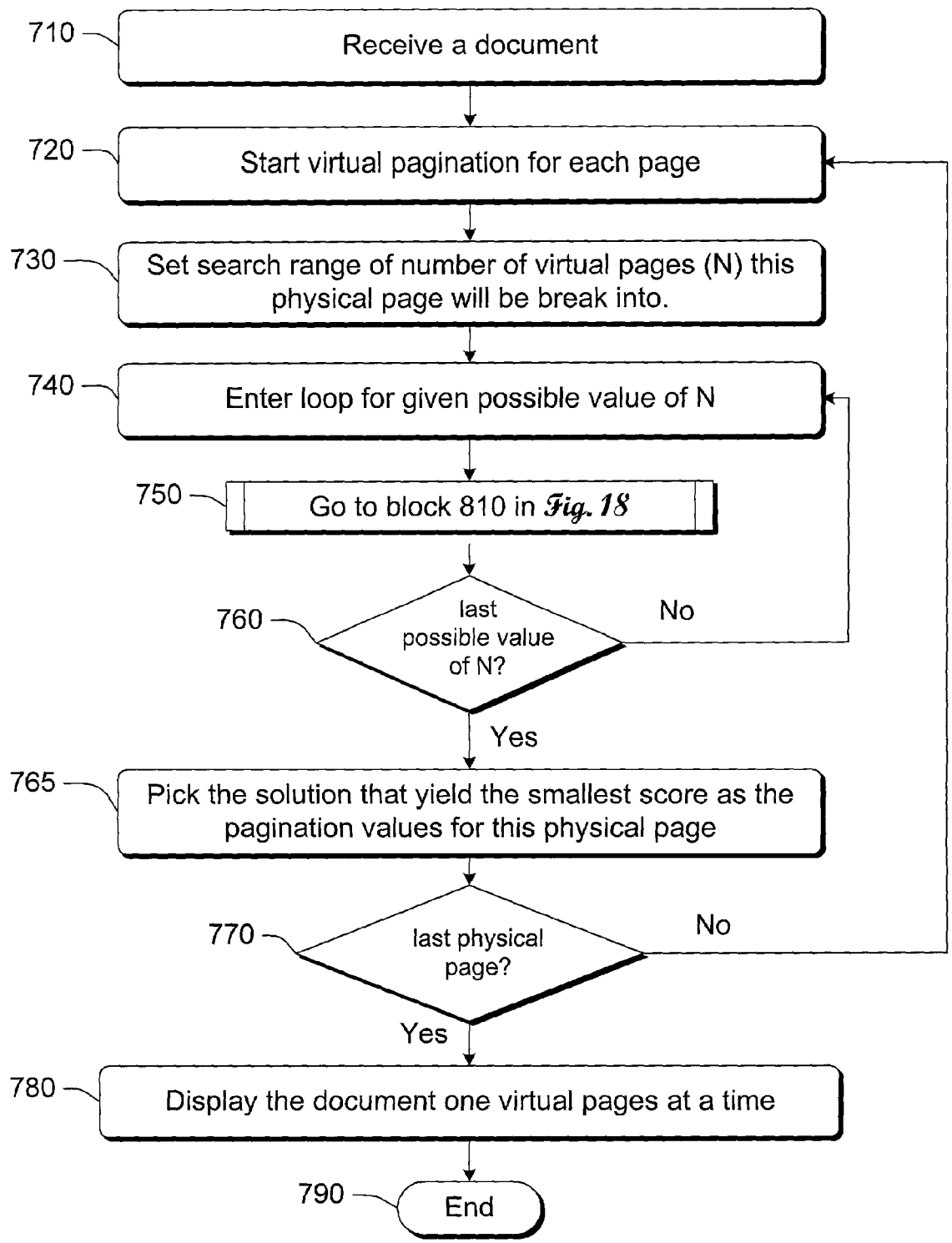
FIG. 17 is a flow diagram showing an illustrative methodological implementation of the invention herein.
Figure 18:
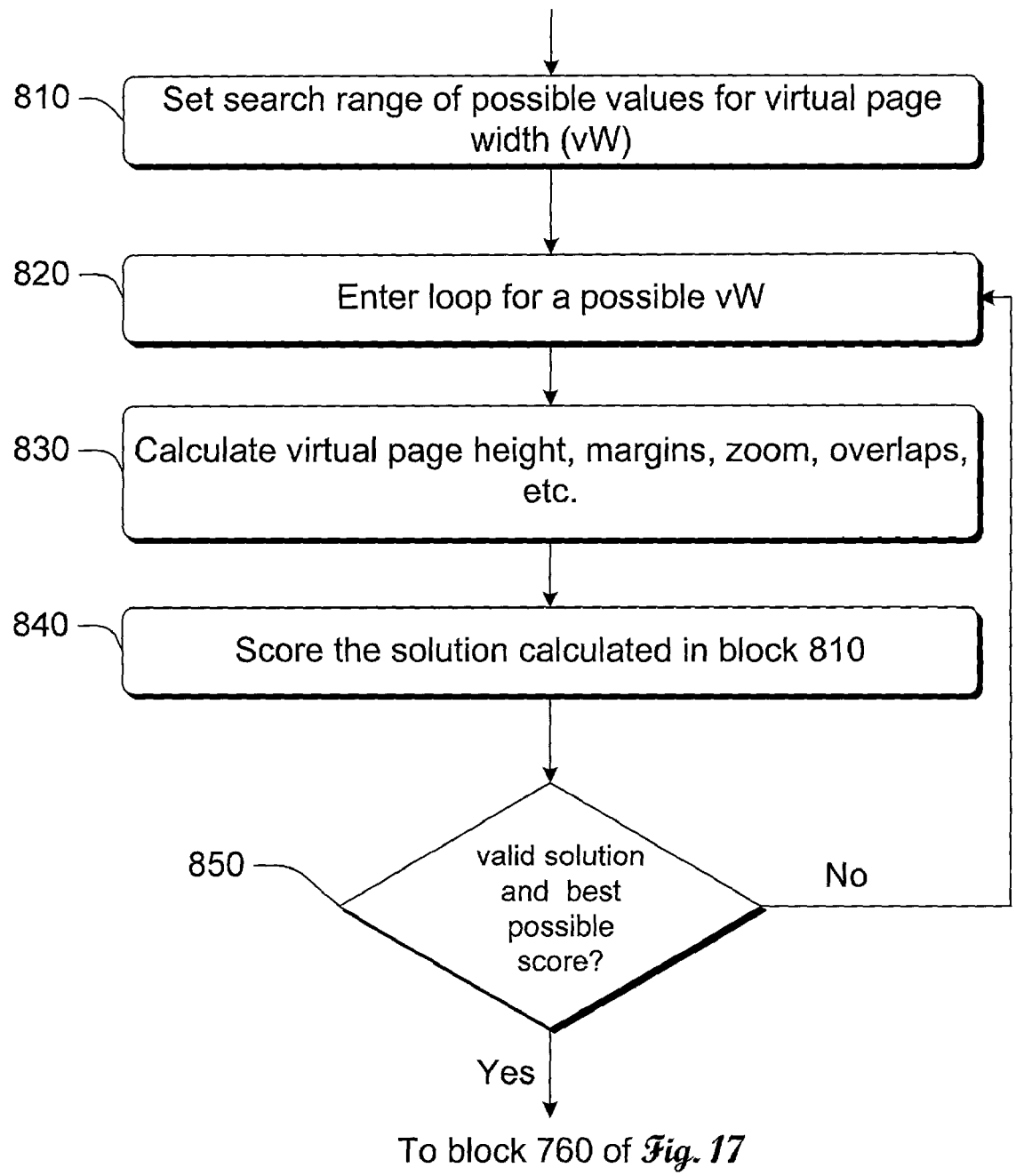
FIG. 18 is a flow diagram showing an illustrative methodological implementation of the invention herein.

Alternative Methodological Implementation of Approach B of Exemplary VP Paradigm FIG. 17 and FIG. 18 show methodological implementations of the exemplary VP paradigm performed by the intelligent VP system 200 (or some portion thereof). These methodological implementations may be performed in software, hardware, or a combination thereof.

FIG. 17 shows at 710, the exemplary VP paradigm receives a document (e.g., a fixed document).

At 720 of FIG. 17, the exemplary VP paradigm starts the process of o calculation virtual pagination for each physical page.

At 730, the exemplary VP paradigm estimates the domain of possible number of virtual pages (N) into which this physical page may be divided. Typically, there are integer numbers. For example, it may be set the range to between 1 to 4 virtual pages per physical page.

At 740, the exemplary VP paradigm starts the process of finding an optimal solution based on a given N value.

At 750, the process of finding an optimal solution based on a given N value is illustrated in FIG. 18.

At 760, the exemplary VP paradigm determines whether it has found the optimal solution for this physical page. If not, then it returns to block 740. If so, then it proceeds to the next block in this process, which is block 765.

At 765, the exemplary VP paradigm uses the optimal solution determined in block 760 for the virtual pagination of this physical page.

At 770, the exemplary VP paradigm determines whether it has done virtual pagination for all physical pages in the document. If not, it returns to block 720 to calculate for the next physical page. If so, then it proceeds to the next block in this process, which is block 780.

At 780, a display displays the fixed document one virtual page at a time in accordance with the virtual pagination performed by the above-described blocks. Alternatively, the display may display more than one virtual page at time. At 790, the process ends.

FIG. 18 shows a methodological implementation for finding an optimal solution based on a given N value.

At 810 of FIG. 18, the exemplary VP paradigm estimates the domain of possible values for the virtual page width (vW). For example, the domain may be between 10% of the screen page width and 100% of the screen page width.

At 820, the exemplary VP paradigm starts the process of evaluate each possible vW.

At 830, the exemplary VP paradigm calculates all the values used in virtual pagination based on the given values of N and vW. See table 5 for more details.

At 840, the exemplary VP paradigm scores this solution based on factors described above.

At 850, the exemplary VP paradigm determines if this solution is valid based on table 6 and if it has the best possible score for the given N value. If not, it returns to block 820 to calculate for the next vW value. If so, then it proceeds to the next block in this process, which is the end of this process. It returns to block 760 in FIG. 17.

Although the search logic illustrated in blocks 740, 760 of FIG. 17 and block 820, 850 of FIG. 18 appear to be a simple loop iteration of all possible combinations of N and vW, approaches that are more complex may be used. These are simplified illustrations. Examples of such approaches include "divide and conquer" search algorithms. Other such search algorithms are known to those of ordinary skill in the art.

Other Implementations

Although the description herein of the implementations of the exemplary VP paradigm is primarily focused upon the intelligent virtual pagination of fixed documents, other implementations may be directed to the virtual pagination of non-fixed documents. For example, the use of synthetic margins and universal starting points would be particularly applicable to the virtual pagination of all documents (fixed or otherwise).

Exemplary Computing System and Environment

FIG. 19 illustrates an example of a suitable computing environment 900 within which an exemplary VP paradigm, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary VP paradigm may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary VP paradigm may be described in the general context of computer-executable instructions, such as program modules, being executed by a computer. Generally, program modules include routines, programs, objects, components, data structures, etc. that perform particular tasks or implement particular abstract data types. The exemplary VP paradigm may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 19 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to A be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a document obtainer, a virtual paginator, a virtual-page analyzer, a display generator, and a display.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A scanner (not shown, but one of the possible input devices 938) is particularly relevant to implementations of the exemplary VP paradigm. That is because it is a mechanism through which paper documents may be converted to electronic documents. As its name suggests, a scanner scans in the paper document and generates an image of such document. That image is a fixed digital form of that document.

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary VP paradigm may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 19 illustrates an example of a suitable operating environment 900 in which an exemplary VP paradigm may be implemented. Specifically, the exemplary VP paradigm(s) described herein may be implemented (wholly or in part) by any program modules 928-930 and/or operating system 926 in FIG. 19 or a portion thereof.

The operating environment is only an example of a suitable operating environment and is not intended to suggest any limitation as to the scope or use of functionality of the exemplary VP paradigm(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary VP paradigm may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the invention.

The invention claimed is:

1. A method for facilitating enhanced readability of a fixed digital document having multiple pages, the method comprising:
   obtaining the fixed digital document at a computing system implementing an intelligent virtual paging system, wherein the fixed digital document cannot be modified using a character based application;
   paginating, at the computing system, the multiple pages of the fixed digital document into multiple virtual pages through a virtual paging zoom and pan paradigm;
   identifying and locating lines of text within the multiple pages of the fixed digital document at the computing system;
   determining, at the computing system, whether a virtual-page boundary is coextensive with an identified line of text;
   responsive to such determining, adjusting the virtual-page boundary at the computing system if the boundary is coextensive with the identified line of text so that the boundary is not coextensive with the identified line.

2. A method as recited in claim 1 further comprising displaying a virtual page of the multiple virtual pages at a display device associated with the computing system and doing so without displaying overlap.

3. A method as recited in claim 1 further comprising displaying virtual pages of the multiple virtual pages at a display device associated with the computing system, wherein unrepeated content of multiple virtual pages starts at a common spatial position on the multiple virtual pages.

4. A method as recited in claim 1 further comprising displaying virtual pages of the multiple virtual pages at a display device associated with the computing system, wherein a top synthetic virtual-page margin is displayed so that the content of the virtual page starts at a common spatial position.

5. A method as recited in claim 1, wherein the identifying and locating comprises performing at least minimal OCR on content of the document to locate line boundaries.

6. A method as recited in claim 1, wherein the paginating comprises determining a minimum integer number of virtual pages per page of the digital document while maintaining legibility, aspect ratio, and good margins.

7. A computer comprising one or more computer-readable storage media having computer-executable instructions that, when executed by the computer, perform the method as recited in claim 1.

8. A computer-readable storage medium having computer-executable instructions that, when executed by a computer, performs the method as recited in claim 1.

9. A method for facilitating enhanced readability of a digital document, the method comprising:
   paginating multiple pages of the digital document into multiple virtual pages at a computing system implementing an intelligent virtual paging system, wherein the digital document is a fixed digital document which cannot be modified using a character based application;
   determining, at the computing system, whether a virtual-page boundary is coextensive with a line of text of a virtual page of the digital document;
   placing a virtual-page boundary of the virtual page at the computing system so that such boundary is not coextensive with the line of text when the virtual-page boundary is coextensive with the line of text of the virtual page; and
   determining, at the computing system, an overlap area for the virtual page when the virtual-page boundary is not coextensive with the line of text of the virtual page.

10. A method as recited in claim 9 further comprising identifying and locating lines of text within the multiple pages of the digital document at the computing system.

11. A method as recited in claim 9 further comprising displaying the virtual page of the multiple virtual pages at a display device associated with the computing system and doing so without displaying overlap.

12. A method as recited in claim 9 further comprising displaying virtual pages of the multiple virtual pages at a display device associated with the computing system, wherein unrepeated content of the multiple virtual pages starts at a common spatial position on the multiple virtual pages.

13. A method as recited in claim 9, wherein the paginating comprises determining a minimum integer number of virtual pages per page of the digital document while maintaining legibility, aspect ratio, and good margins.

14. A computer comprising one or more computer-readable storage media having computer-executable instructions that, when executed by the computer, perform the method as recited in claim 9.

15. A computer-readable storage medium having computer-executable instructions that, when executed by a computer, performs the method as recited in claim 9.

16. A method for facilitating enhanced readability of a digital document, the method comprising:
   paginating multiple pages of the digital document into multiple virtual pages at a computing system implementing an intelligent virtual paging system, wherein the digital document is a fixed digital document which cannot be modified using a character based application;
   determining, at the computing system, whether a virtual-page boundary is coextensive with a line of text of a virtual page of the digital document;
   adjusting, at the computing system, the virtual-page boundary into white space before the line of text when the virtual-page boundary is coextensive with the line of text; and
   displaying the virtual pages of the multiple virtual pages at a display device associated with the computing system and doing so without displaying overlap.

17. A method as recited in claim 16, wherein the paginating comprises separating the one or more pages of the digital document into multiple virtual pages without splitting lines of text of the document.

18. A method as recited in claim 16, wherein the paginating comprises:
   identifying lines of text within the digital document;
   separating the one or more pages of the digital document into multiple virtual pages between lines of text.

19. A method as recited in claim 16, wherein the paginating comprises determining a minimum integer number of virtual pages per page of the digital document while maintaining legibility, aspect ratio, and good margins.

20. A computer comprising one or more computer-readable storage media having computer-executable instructions that, when executed by the computer, perform the method as recited in claim 16.

21. A computer-readable storage medium having computer-executable instructions that, when executed by a computer, performs the method as recited in claim 16.

22. A method for enhancing the readability of a fixed digital document, the method comprising:

paginating multiple pages of the fixed digital document at a computing system implementing an intelligent virtual paging system, wherein the fixed digital document cannot be modified using a character based application, into multiple virtual pages;

determining, at the computing system, whether a virtual-page boundary is coextensive with a line of text of a virtual page of the fixed digital document;

displaying the virtual pages of the multiple virtual pages at a display device associated with the computing system, wherein unrepeated content of the multiple virtual pages starts at a common spatial position on the multiple virtual pages and repeated content of the multiple virtual pages is placed above the common spatial position;

lowlighting repeated content on a particular virtual page at the computing system, the repeated content is content repeated from another virtual page.

23. A method as recited in claim 22, wherein the paginating comprises separating the one or more pages of the digital document into multiple virtual pages without splitting lines of text of the document.

24. A method as recited in claim 22, wherein the paginating comprises:
identifying lines of text within the digital document;
separating the one or more pages of the digital document into multiple virtual pages between identified lines of text.

25. A method as recited in claim 22, wherein the paginating comprises determining a minimum integer number of virtual pages per page of the digital document while maintaining legibility, aspect ratio, and good margins.

26. A computer comprising one or more computer-readable storage media having computer-executable instructions that, when executed by the computer, perform the method as recited in claim 22.

27. A computer-readable storage medium having computer-executable instructions that, when executed by a computer, performs the method as recited in claim 22.

28. A method for facilitating enhanced readability of a fixed digital document, the method comprising:
paginating multiple pages of the fixed digital document at a computing system implementing an intelligent virtual paging system, wherein the fixed digital document cannot be modified using a character based application, into multiple virtual pages;
determining, at the computing system, whether a virtual-page boundary is coextensive with a line of text for each virtual page of the multiple virtual pages;
displaying each virtual page of the multiple virtual pages with overlap at a display device associated with the computing system, wherein the overlap of one virtual page includes content of the document repeated from another virtual page;
indicating such overlap during the displaying via the computing system, wherein the content of overlap is differentiated from other content.

29. A method as recited in claim 28, wherein the overlap is lowlighted.

30. A method as recited in claim 28, wherein unrepeated content of the multiple virtual pages starts at a common spatial position on the multiple virtual pages.

31. A method as recited in claim 28, wherein the overlap is softly lowlighted.

32. A method as recited in claim 28, wherein the overlap is shaded.

33. A method as recited in claim 28, wherein the overlap is "grayed."

34. A method as recited in claim 28, wherein the paginating comprises determining a minimum integer number of virtual pages per page of the digital document while maintaining legibility, aspect ratio, and good margins.

35. A computer comprising one or more computer-readable storage media having computer-executable instructions that, when executed by the computer, perform the method as recited in claim 28.

36. A computer-readable storage medium having computer-executable instructions that, when executed by a computer, performs the method as recited in claim 28.

37. A method for facilitating the enhanced readability of a digital document, the method comprising:
determining, at a computing system implementing an intelligent virtual paging system, an integer number of virtual pages per page of the digital document while maintaining legibility, aspect ratio, and good margins, wherein the digital document is a fixed digital document having multiple pages and cannot be modified using a character based application;
paginating, accordingly, the multiple pages of the digital document into multiple virtual pages at the computing system;
locating lines of text of the digital document at the computing system by employing a coarse optical character recognition (OCR) technique that identifies that a line of marks is text without identifying specific content; and
determining, at the computing system, whether a virtual-page boundary is coextensive with a line of text of a virtual page of the fixed digital document.

38. A method as recited in claim 37, wherein the determining determines the minimum integer number of virtual pages per page of the digital document.

39. A method as recited in claim 37 further comprising displaying one or more of the virtual pages.

40. A computer-readable storage medium having computer-executable instructions that, when executed by a computer, performs the method as recited in claim 37.

41. A reading enhancement system, comprising:
one or more processors;
a document obtainer configured to obtain a digital document, wherein the digital document is a fixed digital document having multiple pages and cannot be modified using a character based application;
a virtual paginator configured to paginate the multiple pages of the digital document into multiple virtual pages, the multiple virtual pages having boundaries there between;
a virtual-page analyzer configured to:
identify and locate lines of text within the multiple pages of the digital document; and
analyze each respective virtual page to determine whether a respective virtual-page boundary is coextensive with a line of text of the respective virtual page; and
a display generator configured to generate and send the virtual pages of the multiple virtual pages to a display.

42. A system as recited in claim 41, wherein the analyzer is further configured to
adjust the respective virtual-page boundary in response to determining that the boundary is coextensive with the line of text of the respective virtual page so that the boundary is not coextensive with the line of text.

43. A system as recited in claim 41, wherein the analyzer is further configured to produce lowlighted overlap, wherein the overlap of one virtual page includes content of the document repeated from another virtual page.

44. A system as recited in claim 41, wherein the virtual paginator is further configured to determine a minimum integer number of virtual pages per page of the digital document while maintaining legibility, aspect ratio, and good margins.

45. A computer-readable storage medium having computer-executable instructions that, when executed by a computer, performs the method comprising:
paginating multiple pages of a digital document into multiple virtual pages, wherein the digital document cannot be modified using a character based application, and wherein the digital document is a fixed digital document having multiple pages;
determining whether a virtual-page boundary is coextensive with a line of text; and
placing a virtual-page boundary so that such boundary is not coextensive with the line of text.

46. A computer-readable storage medium having computer-executable instructions that, when executed by a computer, performs the method comprising:
paginating multiple pages of a digital document into multiple virtual pages;
determining whether a virtual-page boundary is coextensive with a line of text of a virtual page of the digital document; and
displaying one or more virtual pages of the multiple virtual pages and doing so with lowlighted overlap, wherein the overlap of one virtual page includes content of the document repeated from another virtual page and the lowlighted overlap is positioned above unrepeated content that starts at a common spatial position of the multiple virtual pages.

* * * * *